(12) United States Patent
Takada

(10) Patent No.: US 8,994,319 B2
(45) Date of Patent: Mar. 31, 2015

(54) ELECTRIC MOTOR AND ELECTRICAL APPARATUS EQUIPPED WITH SAME

(75) Inventor: Masayuki Takada, Aichi (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 177 days.

(21) Appl. No.: 13/990,112

(22) PCT Filed: Dec. 28, 2011

(86) PCT No.: PCT/JP2011/007249
§ 371 (c)(1),
(2), (4) Date: May 29, 2013

(87) PCT Pub. No.: WO2012/098625
PCT Pub. Date: Jul. 26, 2012

(65) Prior Publication Data
US 2013/0257331 A1    Oct. 3, 2013

(30) Foreign Application Priority Data

Jan. 18, 2011  (JP) .................. 2011-007454
Jan. 31, 2011  (JP) .................. 2011-017545
Mar. 23, 2011  (JP) .................. 2011-063828

(51) Int. Cl.
*H02P 27/04*    (2006.01)
*H02P 7/06*     (2006.01)
(Continued)

(52) U.S. Cl.
CPC ............. *H02P 7/06* (2013.01); *H02K 1/2753* (2013.01); *H02K 21/16* (2013.01); *H02P 6/085* (2013.01); *H02K 1/02* (2013.01); *H02K 2201/03* (2013.01); *H02K 2213/09* (2013.01)
USPC ........... 318/801; 318/400.01; 318/400.14; 318/400.15; 318/430; 318/432; 310/152; 310/154.27; 310/156.32; 310/156.11; 310/156.35; 700/276

(58) Field of Classification Search
USPC ........ 318/139, 400.01, 400.14, 400.15, 118, 318/400.07, 400.17, 400.22, 400.23, 318/400.38, 689, 705, 725, 727, 735, 773, 318/799, 800, 801, 805, 808, 812, 825, 430, 318/431, 432, 491; 310/12.19, 12.24, 310/49.32, 152, 154.27, 156.01, 156.11, 310/156.32, 156.35, 216.074; 700/276
See application file for complete search history.

(56) References Cited

U.S. PATENT DOCUMENTS 7,710,056 B2 *   5/2010   Takada .............. 318/400.17
7,764,031 B2 *   7/2010   Takada .............. 318/400.07
(Continued)

FOREIGN PATENT DOCUMENTS

CN      1864320     11/2006
CN    101479923      7/2009
(Continued)

OTHER PUBLICATIONS

English Translation of Chinese Search Report issued on Oct. 29, 2014 for the related Chinese Patent Application No. 201180065400.5.
(Continued)

*Primary Examiner* — Antony M Paul
(74) *Attorney, Agent, or Firm* — RatnerPrestia

(57) ABSTRACT

An electric motor includes a magnet rotor which is placed with an air gap interposed between it and a stator and has a magnetic pole portion formed from a plastic magnet which swells by hydrogen bonds, an inverter circuit, a DC-voltage conversion portion, a driving logic control portion, a supply current value control portion, a current value designation portion, a reference current value designation portion, and a correlation designation portion, wherein the correlation designation portion determines an average current value by changing the average current value linearly or non-linearly with respect to a reference current value, and the magnetic pole portion absorbs moisture to swell, thereby making the air gap smaller, at higher humidity than a reference humidity.

10 Claims, 11 Drawing Sheets

(51) Int. Cl.
*H02K 1/27* (2006.01)
*H02K 21/16* (2006.01)
*H02P 6/08* (2006.01)
*H02K 1/02* (2006.01)

(56) References Cited

U.S. PATENT DOCUMENTS

| | | |
|---|---|---|
| 2006/0208686 A1 | 9/2006 | Takada |
| 2008/0303464 A1* | 12/2008 | Takada ................... 318/400.17 |
| 2009/0104034 A1 | 4/2009 | Takada |
| 2009/0108785 A1* | 4/2009 | Takada ................... 318/400.38 |
| 2009/0129017 A1 | 5/2009 | Takada |
| 2011/0000652 A1 | 1/2011 | Takada |

FOREIGN PATENT DOCUMENTS

| | | |
|---|---|---|
| JP | 7-15898 A | 1/1995 |
| JP | 9-6138 A | 1/1997 |
| JP | 2006-149048 A | 6/2006 |
| JP | 2007-100574 A | 4/2007 |
| JP | 2009-136055 A | 6/2009 |
| JP | 2009-209873 | 9/2009 |
| JP | 2009-221874 A | 10/2009 |
| JP | 2011-157910 A | 8/2011 |

OTHER PUBLICATIONS

International Search Report for PCT/JP2011/007249, Jan. 24, 2012.

* cited by examiner

ELECTRIC MOTOR AND ELECTRICAL APPARATUS EQUIPPED WITH SAME

TECHNICAL FIELD

The present invention relates to electric motors and electrical apparatuses equipped with the same.

BACKGROUND ART

In recent years, electric motors mounted in electrical apparatuses, such as ventilation apparatuses, are required to have preferable controllability, in addition to inexpensiveness, higher efficiencies and quietness. In this case, electric motors having preferable controllability refer to those which are capable of ventilation with optimum air quantities, depending on the conditions of rooms, without being influenced by pressure losses caused by duct pipe shapes and by pressure-loss changes caused by external wind pressures or clogging in filters and the like. PTL 1 discloses the structure of a conventional electric motor of this type.

Hereinafter, with reference to FIG. 11, a conventional electric motor will be described. FIG. 11 is a block diagram illustrating the conventional electric motor. As illustrated in FIG. 11, electric motor 101 includes driving logic control portion 105 and inverter circuit 106. Further, electric motor 101 includes designated current value change portion 117, current value designation portion 119, and supply current value control portion 122. In this case, designated current value change portion 117 controls characteristics of the current with respect to the output voltage from lower-DC-voltage conversion portion 108, which is adapted to supply a power supply to inverter circuit 106, such that the current linearly increases with increasing output voltage.

This conventional electric motor 101 has had the problem that it has not been able to make differences between amounts of air blowing at lower humidity and amounts of air blowing at higher humidity, depending on the humidity in the room, in view of realization of comfortable air quality in the room. There has been a need for electric motors which are capable of controlling the amount of air blowing depending on the humidity change and, further, are capable of facilitating adjustments of specifications, such as air-quantity/static-pressure characteristics and a plurality of air-quantity settings, without necessitating increased circuit spaces, in particular, and without using specific sensors or microcomputers.

CITATION LIST

Patent Literature

PTL 1: Unexamined Japanese Patent Publication No. 2006-149048

SUMMARY OF THE INVENTION

An electric motor according to the present invention includes: a magnet rotor which is rotatably placed with an air gap interposed between the magnet rotor and a stator around which a driving coil is wound, the magnet rotor having a magnetic pole portion formed from a plastic magnet which swells by a hydrogen bond; an inverter circuit including an upper-stage switching device and a lower-stage switching device which are connected to each other in a bridge manner; a DC-voltage conversion portion which is formed from a chopper circuit adapted to apply a DC voltage to the inverter circuit; a driving logic control portion adapted to supply the DC voltage generated by the DC-voltage conversion portion to the driving coils through the inverter circuit, in a successive full-wave energization manner according to a predetermined direction and in a predetermined order; a supply current value control portion adapted to control an average current supplied to the inverter circuit, such that the average current is constant, by varying the voltage outputted from the DC-voltage conversion portion; a current value designation portion adapted to designate an average current value for which the supply current value control portion controls to be constant; a reference current value designation portion adapted to set a reference current value to be designated by the current value designation portion, when the DC voltage generated by the DC-voltage conversion portion is a predetermined voltage; and a correlation designation portion adapted to provide the current value designation portion with designation of a correlation between the reference current value and the average current value, according to the voltage value of the DC voltage generated by the DC-voltage conversion portion; the correlation designation portion is adapted to determine the average current value by changing the average current value linearly or non-linearly with respect to the reference current value, and the magnetic pole portion is adapted to absorb moisture to swell to make the air gap smaller, at a higher humidity than a reference humidity.

With the electric motor having this structure, the axial torque is increased with increasing rotation speed. Further, at higher humidity than a reference humidity, the magnetic pole portion in the magnet rotor absorbs moisture to swell, which makes the air gap smaller, thereby increasing the induced voltage induced in the driving coil. Therefore, the electric motor generates an increased axial torque at the same rotation speed and, therefore, the electric motor and the electrical apparatus can realize increased air quantities in control in a constant air-quantity manner, without using a microcomputer or a specific sensor such as a humidity sensor.

DESCRIPTION OF EMBODIMENT

Hereinafter, embodiments of the present invention will be described, with reference to the accompanying drawings.

Exemplary Embodiment

Figure 1:
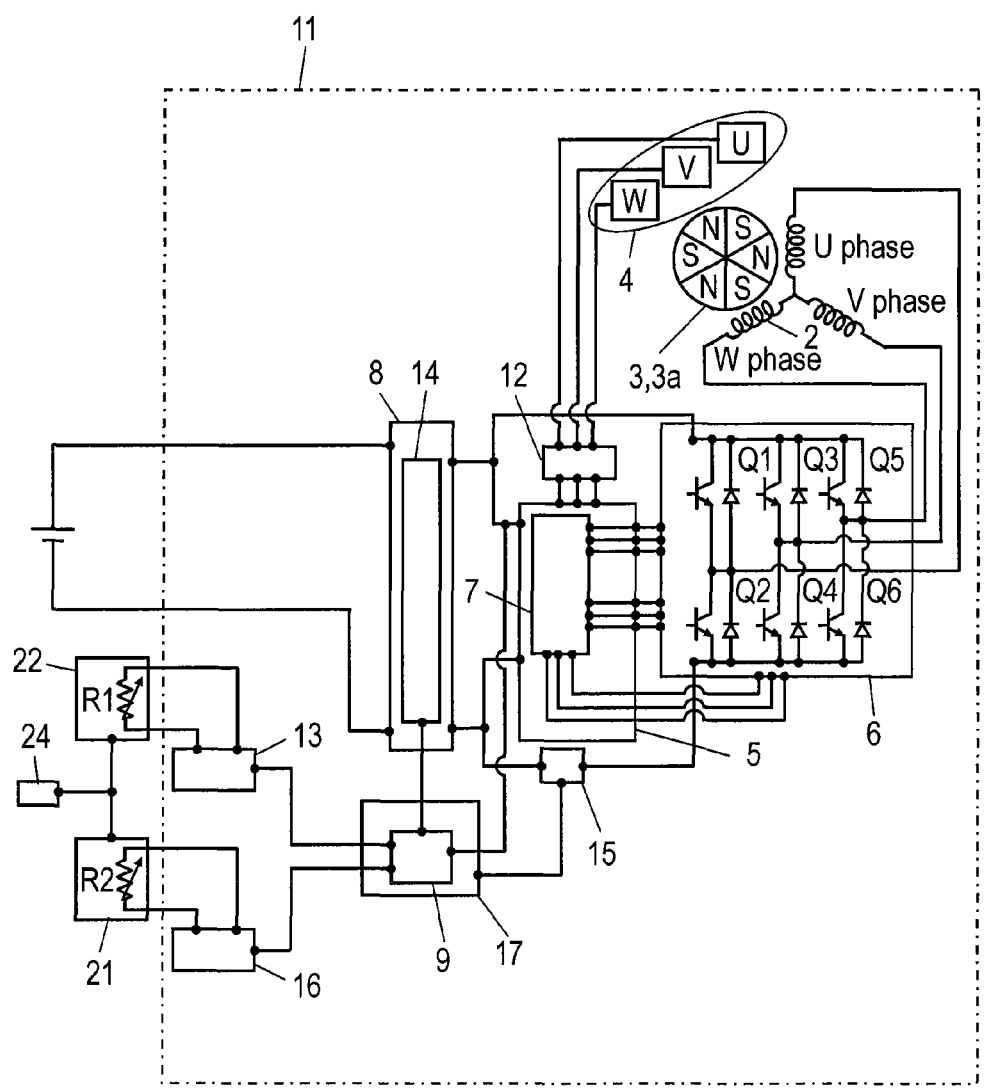
FIG. 1 is a block diagram illustrating an electric motor according to an embodiment of the present invention.

FIG. 1 is a block diagram illustrating an electric motor according to an embodiment of the present invention. Electric motor 11 includes magnet rotor 3, inverter circuit 6, DC-voltage conversion portion 8, driving logic control portion 5, supply current value control portion 17, current value designation portion 9, reference current value designation portion 16, and correlation designation portion 13. Magnet rotor 3 in electric motor 11 includes magnetic pole portion 3a which is constituted by a plastic magnet containing polyamide 6 resin as a main binder and, further, containing an elastomer as an auxiliary binder, wherein polyamide 6 resin has a smaller number of methylene groups per single amide group. Further, magnetic pole portion 3a is constituted by a polar anisotropic magnet generated by performing pole orientation during injection molding.

Further, electric motor 11 incorporates Hall device 4, magnetic-flux-density distribution waveform synthesis portion 12, inverter circuit 6, driving logic control portion 5, and current waveform control portion 7. Hall device 4 forms a magnetic-pole position detection means adapted to detect magnetic-pole positions in magnetic rotor 3, and a magnetic-flux-density distribution. Magnetic-flux-density distribution waveform synthesis portion 12 synthesizes waveforms outputted from Hall device 4. Inverter circuit 6 includes upper-stage switching devices Q1, Q3 and Q5 and lower-stage switching devices Q2, Q4, and Q6 which are connected to each other in a bridge manner. Driving logic control portion 5 controls ON/OFF of upper-stage switching devices Q1, Q3 and Q5 and lower-stage switching devices Q2, Q4, and Q6, in such a way as to supply electricity to driving coils 2, in a successive full-wave energization manner according to predetermined directions and in a predetermined order, based on the output from magnetic-flux-density distribution waveform synthesis portion 12. Current waveform control portion 7 included in driving logic control portion 5 adjusts the output bias current, by performing feedback, such that the current waveform in each phase in driving coil 2 has a substantially sine-wave shape which is substantially similar to a waveform resulted from elimination of harmonic components by magnetic-flux-density distribution waveform synthesis portion 12, and such that upper-stage switching devices Q1, Q3 and Q5 and lower-stage switching devices Q2, Q4, and Q6 are brought into a non-saturated state close to saturation.

In this case, magnetic pole portion 3a in magnet rotor 3 is constituted by a polar anisotropic magnet, which causes induced voltages having substantially sine-wave-shaped waveforms to be induced in driving coil 2, thereby causing Hall device 4 to detect waveforms having substantially sine-wave shapes. Further, magnetic-flux-density distribution waveform synthesis portion 12 subtracts the v-phase waveform from the u-phase waveform from Hall device 4, in order to eliminate harmonic components in the waveform of the current supplied to the u phase in driving coil 2. Similarly, magnetic-flux-density distribution waveform synthesis portion 12 subtracts the w-phase waveform from the v-phase waveform from Hall device 4, for the v phase in driving coil 2 and, further, subtracts the u-phase waveform from the w-phase waveform from Hall device 4, for the w phase in driving coil 2.

Accordingly, a current having no non-energization interval is supplied to inverter circuit 6, which eliminates abrupt changes in the current waveforms and, further, suppresses the occurrence of ripples therein. Further, within electric motor 11, there are placed DC-voltage conversion portion 8, current detection portion 15, reference current value designation portion 16, correlation designation portion 13, and supply current value control portion 17.

In this case, DC-voltage conversion portion 8 is constituted by a buck-boost type chopper circuit. The chopper circuit applies a DC voltage to inverter circuit 6. Current detection portion 15 detects the current supplied to inverter circuit 6. Supply current value control portion 17 controls DC-voltage value change portion 14 such that the average value of the current supplied to inverter circuit 6, which is detected by current detection portion 15, is equal to a current value designated by current value designation portion 9, thereby varying the voltage outputted from DC-voltage conversion portion 8, in such a way as to perform feedback control of the average current value for making it substantially constant. Current value designation portion 9 designates the average current value for which supply current value control portion 17 controls to be substantially constant. Reference current value designation portion 16 sets a reference value of the current supplied to inverter circuit 6, to be designated by current value designation portion 9, when the DC voltage generated by DC-voltage conversion portion 8 is a predetermined voltage. Driving logic control portion 5 generates a driving logic for supplying the DC voltage generated by DC-voltage conversion portion 8, to driving coils 2, through inverter circuit 6, in a successive full-wave energization manner according to predetermined directions and in a predetermined order. Further, correlation designation portion 13 designates the correlation between the average current value and the reference current value which are designated by current value designation portion 9, according to the voltage value of the DC voltage generated by DC-voltage conversion portion 8.

Figure 2:
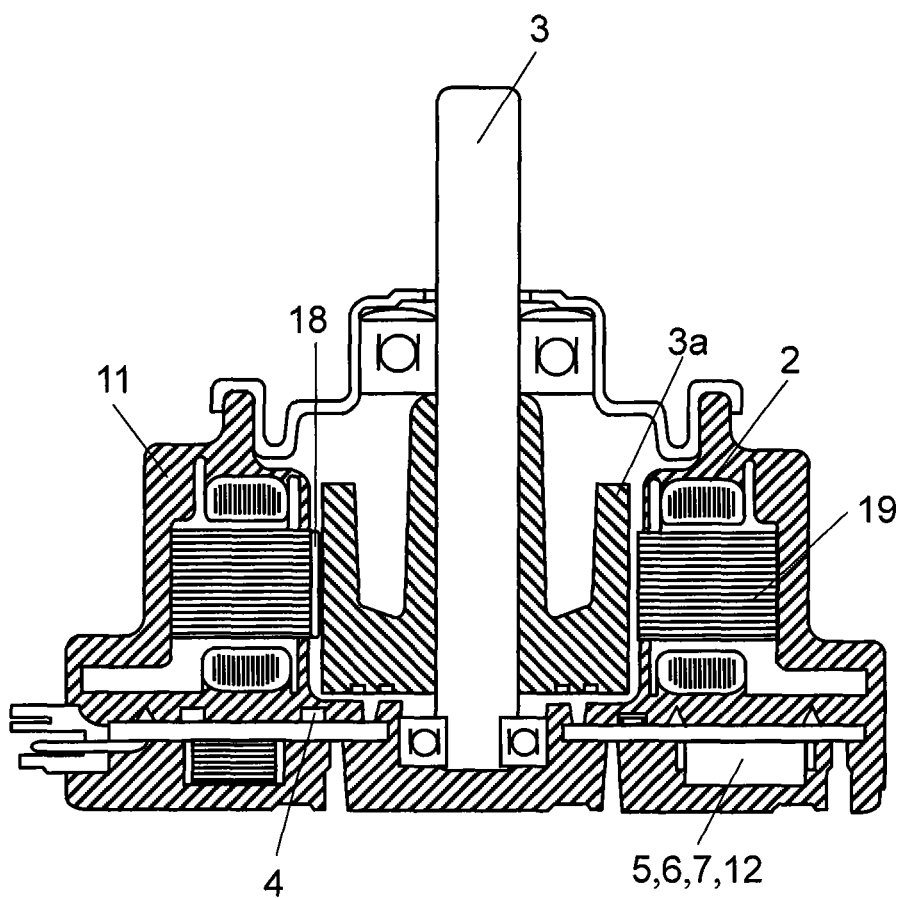
FIG. 2 is a cross-sectional view illustrating the same electric motor.

FIG. 2 is a cross-sectional view of the electric motor according to the embodiment of the present invention. Between magnet rotor 3 and stator 19 around which driving coil 2 is wound, there is formed air gap 18. Magnet rotor 3 is rotatable with respect to stator 19. Hall device 4 is placed on a printed circuit board and is adapted to detect the positions of magnetic poles in magnet rotor 3. The outer cover of electric motor 11 is formed, through molding, from a filler such as calcium carbonate, aluminum hydroxide or wollastonite, and from a resin such as an unsaturated polyester containing a glass fiber.

Figure 3:
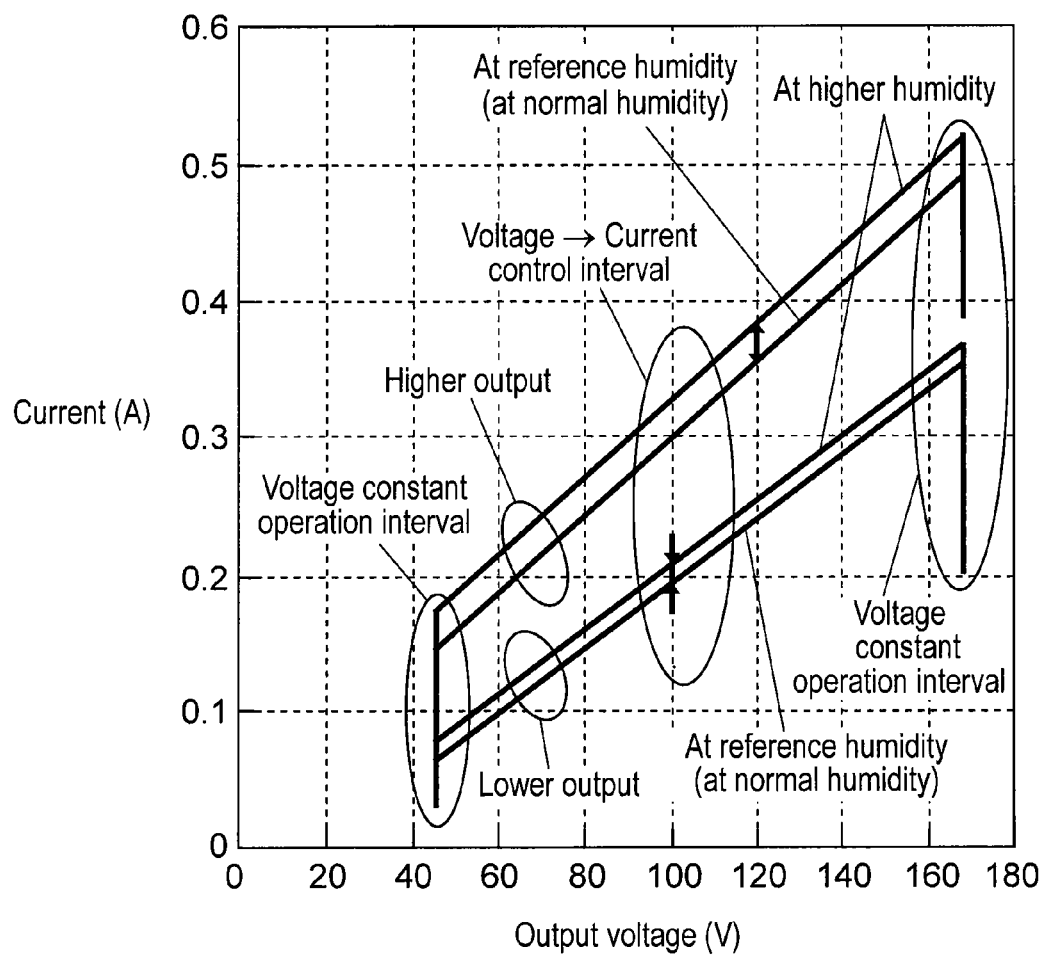
FIG. 3 is a graph illustrating an example of an output-voltage/current characteristic of the same electric motor.

FIG. 3 is a graph illustrating an example of an output-voltage/current characteristic of the electric motor according to the embodiment of the present invention. Correlation designation portion 13 performs feedback of the change of the output voltage, such that the characteristic of the current with respect to the output voltage from DC-voltage conversion portion 8 becomes a characteristic as illustrated in FIG. 3. Further, correlation designation portion 13 provides current value designation portion 9 with designation of the current supplied to inverter circuit 6 by changing the current linearly (proportionally) with respect to the reference current value, according to the magnitude of the value of the voltage outputted from DC-voltage conversion portion 8. In this case, in consideration of the withstand voltage and the kickback voltage of inverter circuit 6, there is defined an upper limit to the DC voltage applied to inverter circuit 6, and there are provided intervals within which it is operated at a constant voltage without being controlled in terms of the current.

Correlation designation portion 13 determines the amount of change by which the average current value is changed with respect to the reference current value designated by reference current value designation portion 16, according to the magnitude of the resistance value of resistance R1 connected thereto. Further, reference current value designation portion 16 determines the reference value of the current supplied to inverter circuit 6 when the DC voltage generated by DC-voltage conversion portion 8 is a predetermined voltage, through the magnitude of the resistance value of resistance R2 connected thereto.

Torque-characteristic change portion 24 changes the resistance value of resistance R2 connected to reference current value designation portion 16, through reference current value designation change portion 21. Further, torque-characteristic change portion 24 changes the resistance value of resistance R1 connected to correlation designation portion 13, through correlation change portion 22. Further, torque-characteristic change portion 24 designates a plurality of torque characteristics and, also, controls reference current value designation change portion 21.

In this electric motor 11, correlation designation portion 13 provides current value designation portion 9 with designation of the average value of the current supplied to inverter circuit 6 by changing the average value linearly with respect to the reference current value, according to the magnitude of the value of the voltage outputted from DC-voltage conversion portion 8. Therefore, as the rotation speed of electric motor 11 is increased, the supplied current is increased. On the contrary, as the rotation speed is decreased, the supplied current is decreased.

Figure 4:
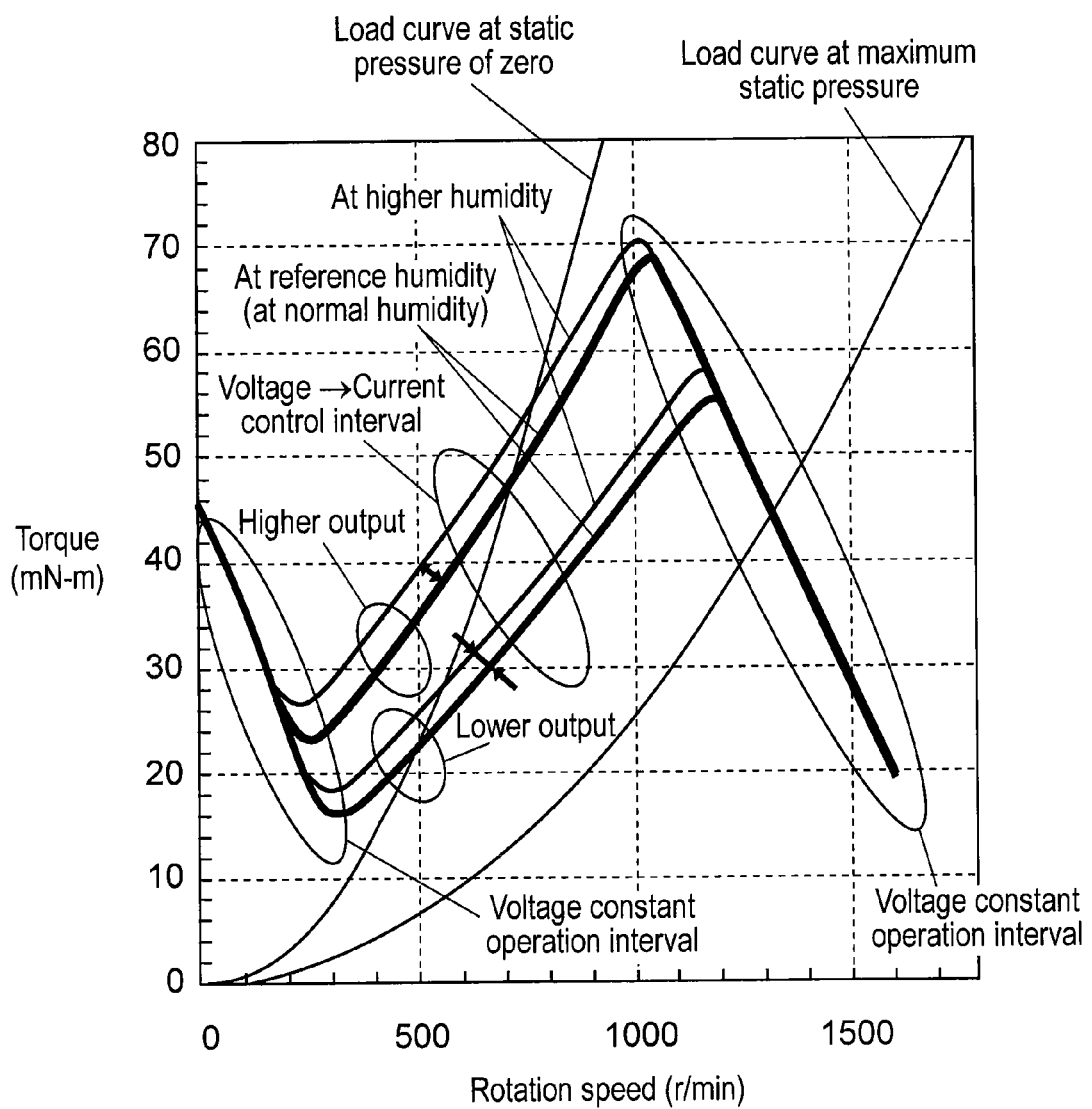
FIG. 4 is a graph illustrating an example of a rotation-speed/torque characteristic of the same electric motor.

FIG. 4 is a graph illustrating an example of a rotation-speed/torque characteristic of the electric motor according to the embodiment of the present invention. As illustrated in FIG. 4, the rotation-speed/torque characteristic of electric motor 11 is such that the axial torque increases with increasing rotation speed.

Figure 5:
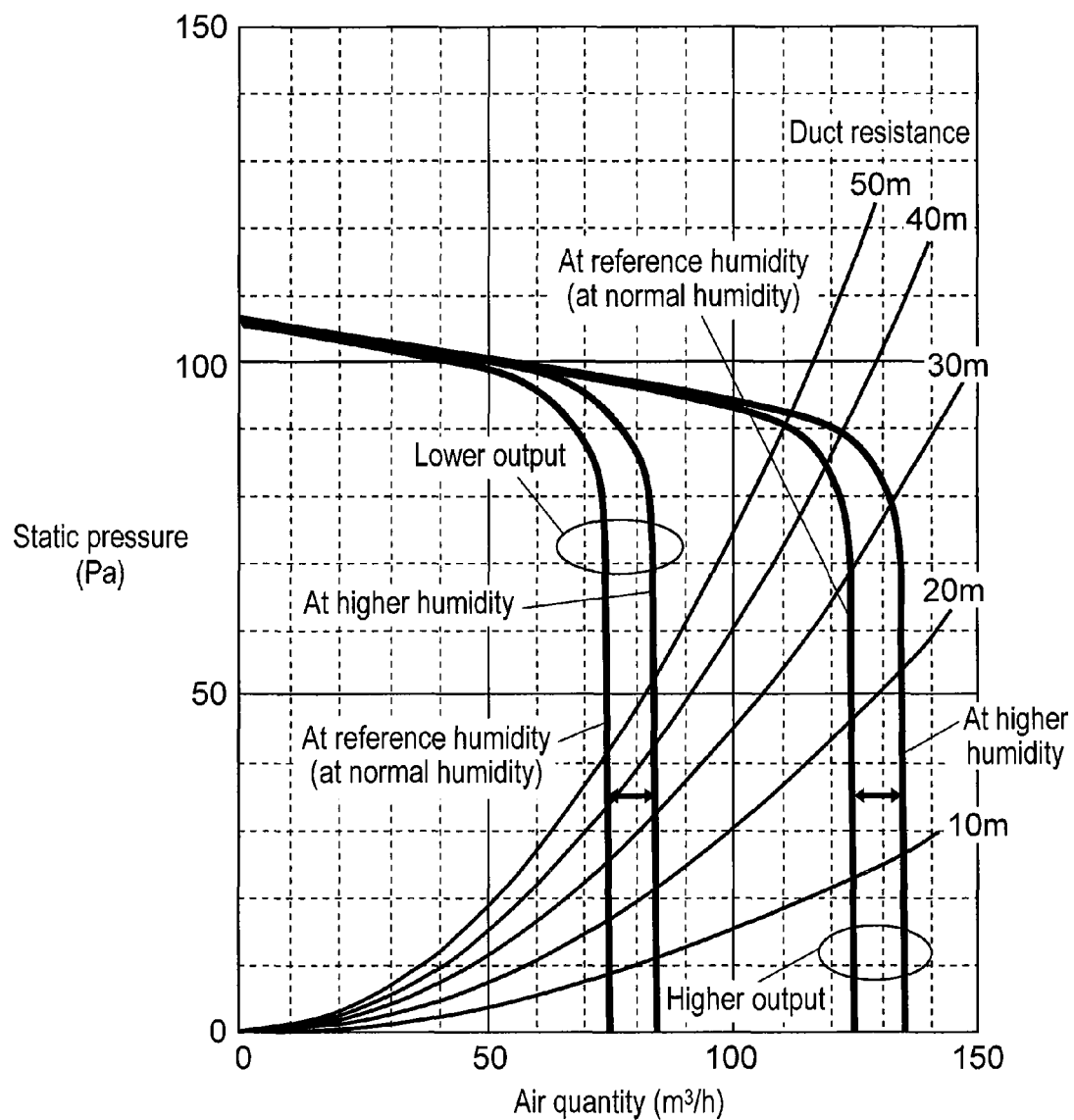
FIG. 5 is a graph illustrating an example of an air-quantity/static-pressure characteristic of a ventilation apparatus equipped with the same electric motor.

FIG. 5 is a graph illustrating an example of an air-quantity/static-pressure characteristic of a ventilation apparatus equipped with the electric motor according to the embodiment of the present invention. As illustrated in FIG. 5, ventilation apparatus 1 equipped with blower apparatus 10 exhibits such an air-quantity/static-pressure characteristic that the air quantity is not largely changed, even in the event of changes of pressure losses, such as external wind pressures and duct lengths. Further, polyamide 6 resin having a smaller number of methylene groups per single amide group, which forms magnetic pole portion 3a in magnet rotor 3, contains a larger number of amide groups in the same molecular length. In polyamide 6 resin, water molecules being hydrogen-bonded to amide groups attract ambient water molecules in higher-humidity areas to form hydrogen bonds between water molecules and water molecules to swell.

Namely, magnet rotor 3 is rotatably placed with air gap 18 interposed between magnet rotor 3 and stator 19, and magnetic pole portion 3a is formed from a plastic magnet which swells by hydrogen bonds. Therefore, at higher humidity, magnetic pole portion 3a in magnet rotor 3 is increased in outer diameter, which makes air gap 18 smaller, thereby increasing the induced voltages induced in driving coil 2. Thus, for the same current supplied to driving coil 2, the axial torque is increased by an amount corresponding to the increase of the induced voltages. This provides an air-quantity/static-pressure characteristic illustrated in FIG. 5 which is such an air-quantity/static-pressure characteristic that the ventilation air quantity increases at higher humidity, in comparison with at a reference humidity (at a normal humidity). Namely, correlation designation portion 13 determines the average current value by changing the average current value linearly or non-linearly with respect to the reference current value. Further, at higher humidity than the reference humidity, magnetic pole portion 3a absorbs moisture to swell, thereby making air gap 18 smaller.

Figure 6A:
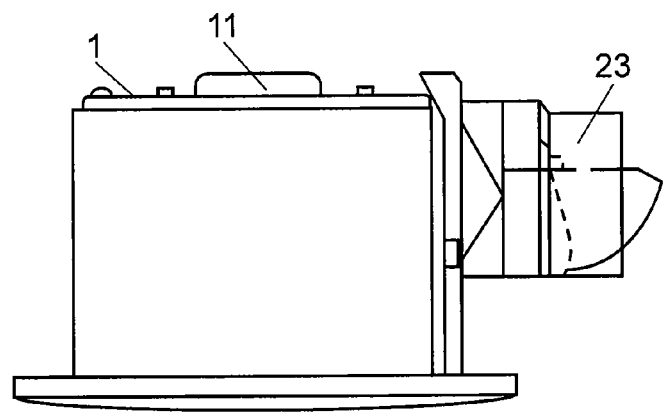
FIG. 6A is an elevation view of a ventilation apparatus equipped with the same electric motor.
Figure 6B:
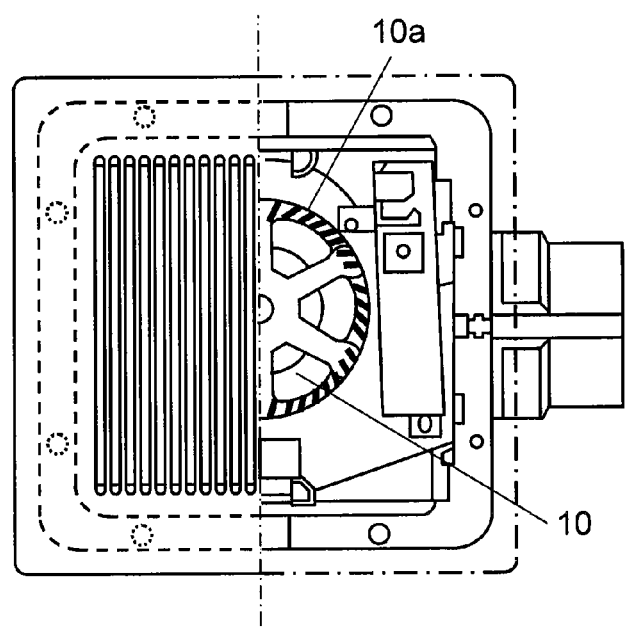
FIG. 6B is a plan view of the ventilation apparatus equipped with the same electric motor.
Figure 6C:
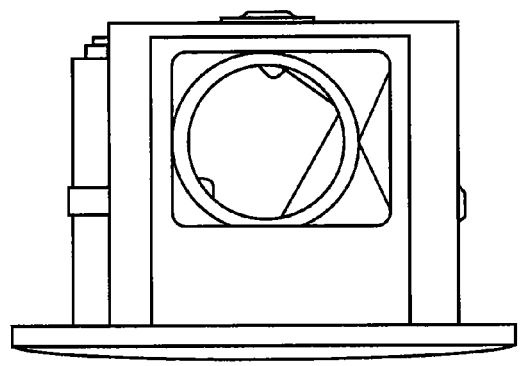
FIG. 6C is a side view of the ventilation apparatus equipped with the same electric motor.

FIG. 6A is an elevation view of the ventilation apparatus equipped with the electric motor according to the embodiment of the present invention. FIG. 6B is a plan view of the ventilation apparatus equipped with the same electric motor. FIG. 6C is a side view of the ventilation apparatus equipped with the same electric motor. As illustrated in FIGS. 6A to 6C, ventilation apparatus 1 incorporates blower apparatus 10. Further, blower apparatus 10 incorporates centrifugal blower 10a equipped with electric motor 11 and, further, is connected to an external power supply. Smokes from cigarettes, and contaminated air in rooms, which is induced during cooking and the like, are sucked by blower apparatus 10, further penetrate the building wall through exhaust ports in ventilation apparatus 1 and through duct 23 and, further, are discharged to the outdoors. Further, as well as ventilation apparatus 1, electrical apparatuses which can be equipped with electric motor 11 include dehumidifiers, humidifiers, air conditioning units, hot-water supply machines, fan-filter units, and cooling units.

Further, the magnitude of the resistance value of resistance R1 connected to correlation designation portion 13 determines the amount of change by which the current is changed with respect to the reference current value designated by reference current value designation portion 16. This enables changing the degree of the increase of the axial torque along with the increase of the rotation speed, in the rotation-speed/torque characteristic of electric motor 11. As a result thereof, it is possible to perform adjustments of specifications for coping with changes of the apparatus internal resistance in ventilation apparatus 1, adjustments of specifications for coping with load changes due to changes of the blade diameter in centrifugal blower 10a, changes in the number of blades and changes in blade specifications, and adjustments of air-quantity/static-pressure characteristics of blower apparatus 10. This enables largely reducing the number of processes required for specification adjustments and, further, enables standardization of electric motor 11 and the main control circuit therein.

Further, the magnitude of the resistance value of resistance R2 connected to reference current value designation portion 16 determines the reference value of the current supplied to inverter circuit 6 when the DC voltage generated by DC-voltage conversion portion 8 is a predetermined voltage. This enables adjustments of specifications for coping with changes of the apparatus interval resistance of ventilation apparatus 1, and adjustments of air quantities in the air-quantity/static-pressure characteristic of ventilation apparatus 1. This enables largely reducing the number of processes required for specification adjustments and, further, enables standardization of electric motor 11 and the main control circuit therein.

Further, the resistance value of resistance R2 connected to reference current value designation portion 16 is changed, according to the state of designation by torque-characteristic change portion 24. This makes it easier to perform air-quantity adjustments, according to the designation from the torque-characteristic change portion 24. This enables air-quantity adjustments through adjustments of only resistance R2, according to necessary air quantities required for the room and the like in which ventilation apparatus 1 is installed. This enables largely reducing the number of processes required for specification adjustments and, further, enables standardization of electric motor 11 and the main control circuit therein.

Further, correlation change portion 22 changes the resistance value of resistance R1 connected to correlation designation portion 13, according to the state of designation by torque-characteristic change portion 24. Namely, torque-characteristic change portion 24 controls correlation change portion 22. This makes it easier to provide air-quantity characteristics coincident to the air-quantity/static-pressure characteristics required for ventilation apparatus 10. This enables air-quantity adjustments through adjustments of only resistance R1, according to necessary air quantities required for the room and the like in which ventilation apparatus 1 is installed. As a result thereof, it is possible to largely reduce the number of processes required for specification adjustments and, further, it is possible to standardize electric motor 11 and the main control circuit therein.

Further, driving logic control portion 5 supplies currents having no non-energization interval to driving coil 2, which largely reduces ripples in the current supplied to inverter circuit 6. This allows blower apparatus 10 and ventilation apparatus 1 to have improved air-quantity accuracy, due to the improvement of the accuracy of the current detection by current detection portion 15. This realizes reduction of vibrations in electric motor 11 due to reduction of torque ripples.

Further, the gap between Hall device 4 and magnetic pole portion 3a is set, such that Hall device 4 detects waveforms which are substantially similar to the induced-voltage waveforms induced in driving coil 2 due to the polar anisotropic magnet. Further, current waveform control portion 7 flows, through driving coil 2, currents having a shape substantially similar to the magnetic-flux-density distribution waveforms detected by Hall device 4, so that the induced-voltage waveforms are substantially similar to the current waveforms. This further reduces torque ripples and the torque change rate, which largely increases the motor efficiency, thereby realizing noise reduction and an efficiency increase in electric motor 11, blower apparatus 10 and ventilation apparatus 1.

Further, the magnetic pole portion in magnet rotor 3 is formed from a polar anisotropic magnet, so that both the induced-voltage waveforms and the current waveform have sine-wave shapes. This further reduces torque ripples and the torque change rate, which largely increases the motor efficiency, thereby realizing noise reduction and an efficiency increase in electric motor 11, blower apparatus 10 and ventilation apparatus 1.

Further, magnetic-flux-density distribution waveform synthesis portion 12 synthesizes the waveforms in the u phase, the v phase and the w phase, which have been detected by Hall device 4. This alleviates the influence of variations in Hall device 4 among the respective phases. Further, the magnetic-flux-density distribution waveforms in the respective phases, which are the u phase, the v phase and the w phase, are basically waveforms which are deviated from each other in phase. Therefore, by performing subtractive synthesis in two phases, it is possible to eliminate harmonic components contained in the detected magnetic-flux-density distribution waveforms. This can suppress the occurrence of rotational unevenness and, further, can reduce torque ripples and the torque change rate, which allows electric motor 11, blower apparatus 10 and ventilation apparatus 1 to have higher qualities.

Further, in the present embodiment, correlation designation portion 13 designates the average value of the current supplied to inverter circuit 6 by changing the average current value linearly with respect to the reference set value, according to the magnitude of the value of the voltage outputted from DC-voltage conversion portion 8. However, the current supplied to inverter circuit 6 can be changed non-linearly (proportionally according to high-powered formulas) with respect to the reference set value. The current supplied to inverter circuit 6 can be appropriately set, such that the characteristic curves of the rotation-speed/torque characteristics have optimum gradients, according to amounts of loads, such as fan loads.

Further, in the present embodiment, the waveforms of the currents supplied to driving coil 2 are substantially similar to the induced-voltage waveforms. However, the waveforms of the currents supplied to driving coil 2 can be determined, according to wide-angle energization schemes such as 120-degree rectangular-wave energization, 140-degree energization or 150-degree energization, or according to sine-wave driving schemes through two-phase modulation, depending on the air-quantity accuracy or noise levels required for applications and products. In any of the cases, electric motor 11 has such a rotation-speed/torque characteristic that the axial torque increases with increasing rotation speed.

Here, in electric motor 11 of the present embodiment, Hall device 4 is employed. However, instead of Hall device 4, it is also possible to employ a sensor-less system which is adapted to detect a current or an induced voltage which is induced in a non-energized phase for determining the phase of energization to magnet rotor 3 and, also, it is possible to employ a system which utilizes a magnetic-pole-position detection means for determining N and S poles in the magnet such as a Hall IC and for detecting magnetic-pole positions in magnet rotor 3.

Further, in the present embodiment, the output bias current is adjusted, by performing feedback, such that upper-stage switching devices Q1, Q3 and Q5 and lower-stage switching devices Q2, Q4, and Q6 are brought into a non-saturated state close to saturation. However, it is also possible to perform PWM control of upper-stage switching devices Q1, Q3 and Q5 and lower-stage switching devices Q2, Q4, and Q6 for controlling the current waveforms. In this case, it is possible to reduce losses in upper-stage switching devices Q1, Q3 and Q5 and lower-stage switching devices Q2, Q4, and Q6, which suppresses heat generation from upper-stage switching devices Q1, Q3 and Q5 and lower-stage switching devices Q2, Q4, and Q6, thereby further extending the available load torque range in electric motor 11.

Further, in the present embodiment, DC-voltage conversion portion 8 is constituted by a buck-boost type chopper circuit, but it can be also constituted by a buck-type chopper circuit.

Further, in the present embodiment, electric motor 11 is configured such that a DC voltage is inputted thereto from an external power supply. However, a commercial AC voltage can be inputted to electric motor 11 and further can be supplied to DC-voltage conversion portion 8 after being rectified and smoothened.

Further, in the present embodiment, reference current value designation change portion 21 changes the resistance value of resistance R2 connected to reference current value designation portion 16, according to the state of designation from torque-characteristic change portion 24. Namely, reference current value designation change portion 21 changes designation of reference current value designation portion 16. Further, correlation change portion 22 controls and changes the resistance value of resistance R1 connected to correlation designation portion 13. However, it is also possible to control only reference current value designation change portion 21 or only correlation change portion 22.

Further, although, in the present embodiment, reference current value designation change portion 21, correlation change portion 22, and torque-characteristic change portion 24 are provided outside electric motor 11, they can be also provided inside thereof.

Figure 7:
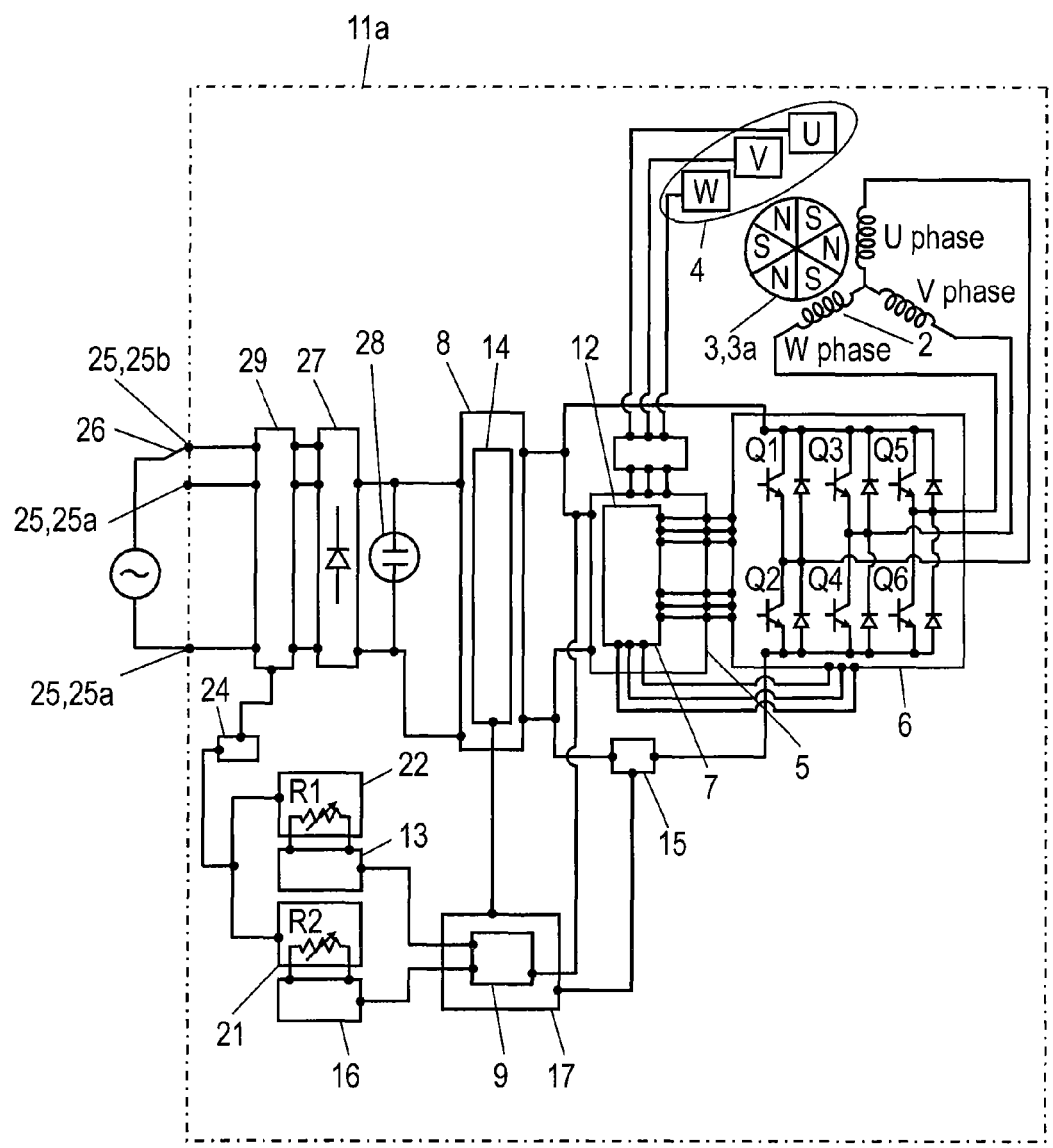
FIG. 7 is a block diagram illustrating a different structure of the same electric motor.

FIG. 7 is a block diagram illustrating a different structure of an electric motor according to an embodiment of the present invention. As illustrated in FIG. 7, a commercial AC power supply is connected to AC power-supply connection portions 25 for connecting an AC power supply thereto, and AC power-supply connection portions 25 includes high-output connection terminal 25*a*, low-output connection terminal 25*b*, and common connection terminal 25*c*. Outer switch 26 is connected to high-output connection terminal 25*a* or low-output connection terminal 25*b*. The commercial AC power supply inputted thereto is rectified and smoothened by rectification portion 27 and smoothing portion 28 and, then, is applied to inverter circuit 6. Torque-characteristic change designation detection portion 29 detects which of high-output connection terminal 25*a* and low-output connection terminal 25*b* outer switch 26 is being connected to and, further, sends a signal to torque-characteristic change portion 24. Torque-characteristic change portion 24 sends signals to reference current value designation change portion 21 and correlation change portion 22.

In this electric motor 11*a* according to the present embodiment, AC power supply connection portions 25 are provided with high-output connection terminal 25*a* and low-output connection terminal 25*b*. Further, torque-characteristic change portion 24 detects whether it is being connected to high-output connection terminal 25*a* or to low-output connection terminal 25*b*. Based on the result thereof, torque-characteristic change portion 24 controls reference current value designation change portion 21 to command it to change the resistance value of resistance R2 connected to reference current value designation portion 16, thereby changing the reference set value of the current supplied to inverter circuit 6. Thus, torque/rotation-speed characteristics in two-stage can be provided and, therefore, air quantities in two stages can be provided, which can provide electric motor 11*a* capable of speed adjustments through changeovers of the connection of the AC power supply line. In this case, AC power supply connection portions 25 can be adapted such that the reference set value can be changed according to designation from torque-characteristic change portion 24, depending on the number of the connection terminals therein, which can provide such an air-quantity/static-pressure characteristic that the ventilation air quantity increases at higher humidity in comparison with at a normal humidity, by amounts corresponding to the number of the connection terminals.

Further, torque-characteristic change portion 24 and torque-characteristic change designation detection portion 29 changes the resistance value of resistance R1 connected to correlation designation portion 13, by controlling correlation change portion 22. Therefore, in electric motor 11*a*, it is possible to easily change the torque/rotation-speed characteristic and the air-quantity/static-pressure characteristic, through changeovers of the connection of the AC power-supply line. In this case, AC power supply connection portions 25 can be adapted such that the correlation can be changed according to designation from torque-characteristic change portion 24 and from torque-characteristic change designation detection portion 29, depending on the number of the connection terminals therein, which can provide such an air-quantity/static-pressure characteristic that the ventilation air quantity increases at higher humidity in comparison with at a normal humidity, by amounts corresponding to the number of the connection terminals. As described above, there are provided a plurality of AC power supply connection portions 25, and torque-characteristic change portion 24 changes torque characteristic, depending on a position of the connection to AC power supply connection portions 25.

Further, reference current value designation change portion 21 changes the resistance value of resistance R2 connected to reference current value designation portion 16, according to designations from torque-characteristic change designation detection portion 29 and from torque-characteristic change portion 24. Further, correlation change portion 22 controls and changes the resistance value of resistance R1 connected to correlation designation portion 13. However, only reference current value designation change portion 21 or only correlation change portion 22 can be controlled, which induces no difference in the effects and advantages.

Figure 8:
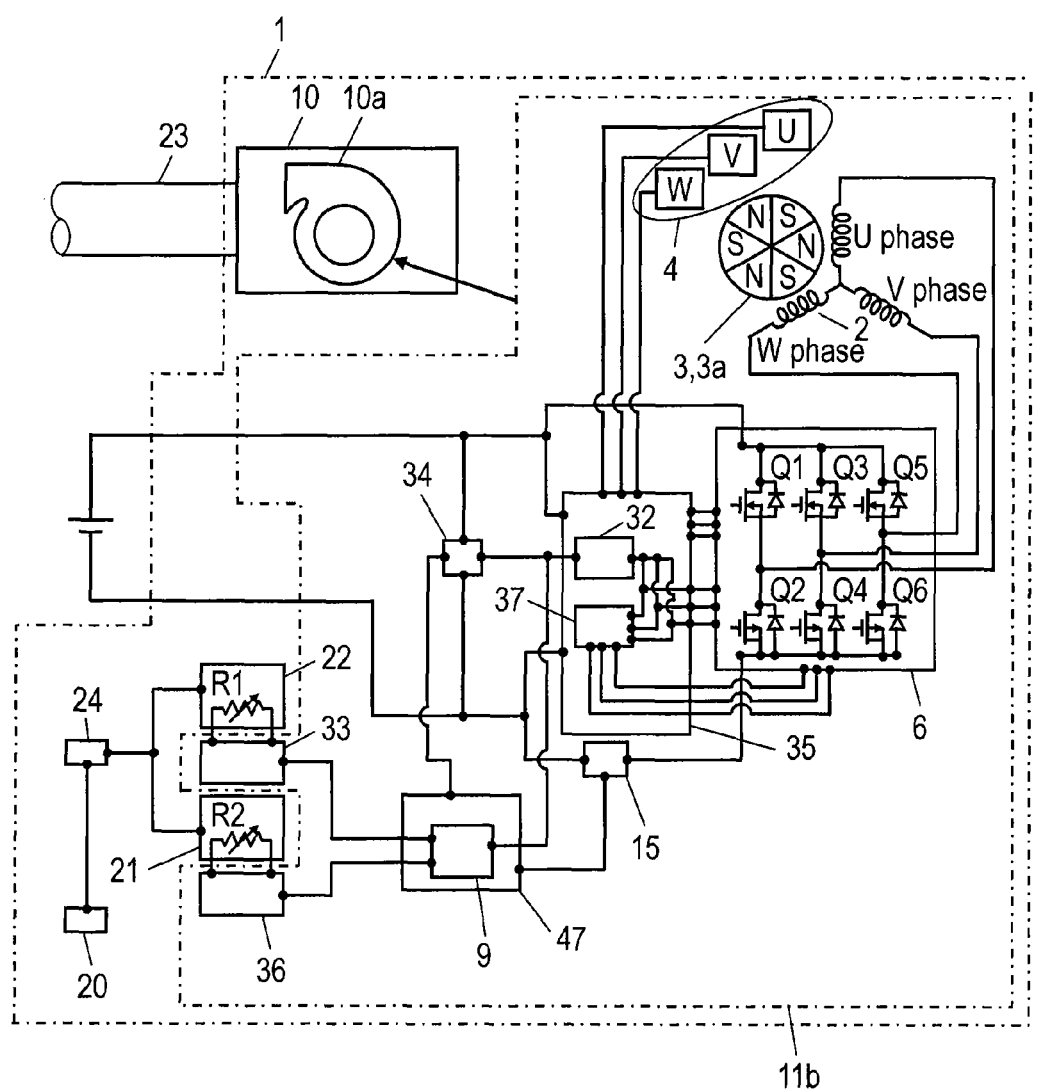
FIG. 8 is a block diagram illustrating a ventilation apparatus incorporating the same electric motor.

FIG. 8 is a block diagram illustrating a ventilation apparatus incorporating the electric motor according to the embodiment of the present invention. The same components as the components illustrated in FIG. 1 are designated by the same reference characters in FIG. 8 and will not be described in detail, and only differences will be described. Ventilation apparatus 1 incorporates blower apparatus 10. Further, blower apparatus 10 incorporates centrifugal blower 10*a* equipped with electric motor 11*b*. Further, electric motor 11*b* incorporates Hall device 4, inverter circuit 6, driving logic control portion 35, and duty-designation-voltage generating portion 34. This driving logic control portion 35 includes PWM control portion 32, and current waveform control portion 37. In this case, driving logic control portion 35 applies, to driving coil 2, a DC voltage as an external power supply which is supplied thereto, based on the output of Hall device 4. Further, driving logic control portion 35 controls ON/OFF of upper-stage switching devices Q1, Q3 and Q5 and lower-stage switching devices Q2, Q4, and Q6, in a successive full-wave energization manner according to predetermined directions and in a predetermined order. Current waveform control portion 37 adjusts the ON/OFF duty in lower-stage switching devices Q2, Q4 and Q6, such that the current waveform in each phase in driving coil 2 has a shape which is substantially similar to the output waveform from Hall device 4. In this case, current waveform control portion 37 controls the current waveform in each phase in driving coil 2 such that it has a substantially sine-wave shape and, therefore, a current having no non-energization interval is supplied to inverter circuit 6, which eliminates abrupt changes in the current waveform and, further, suppresses the occurrence of ripples therein.

Figure 9:
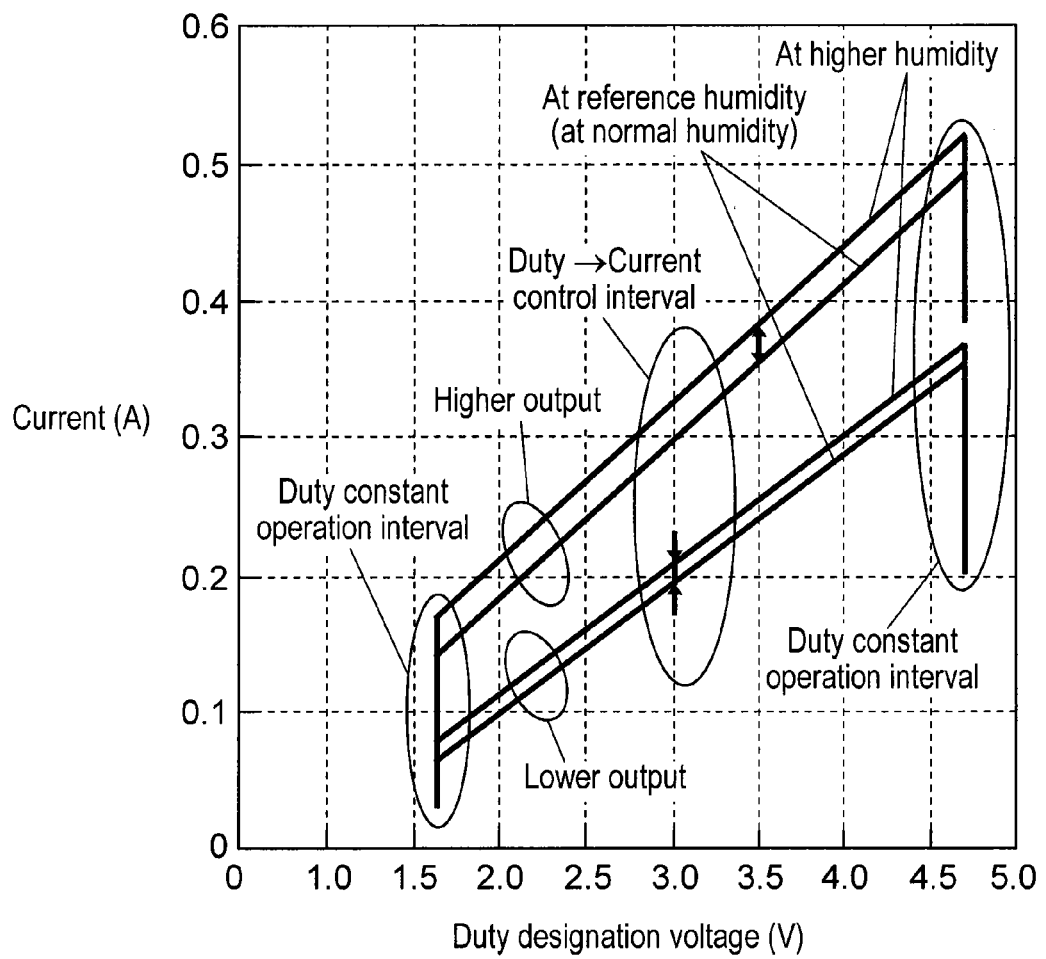
FIG. 9 is a graph illustrating an example of a duty-designation-voltage/current characteristic of the same electric motor.

FIG. 9 is a graph illustrating an example of a duty-designation-voltage/current characteristic of the electric motor according to the embodiment of the present invention. Outside of electric motor 11*b*, there are placed current detection portion 15, duty-designation-voltage generating portion 34 as a DC-voltage conversion portion, reference current value designation portion 36, correlation designation portion 33, supply current value control portion 47, air-quantity designation portion 20, reference current value designation change portion 21, and correlation change portion 22. Correlation designation portion 33 performs feedback of the change of the output voltage, such that the characteristic of the current with respect to the output voltage from duty-designation-voltage generating portion 34 becomes a characteristic as illustrated in FIG. 9. Further, correlation designation portion 33 provides current value designation portion 9 with designation of the current supplied to inverter circuit 6 by changing the current linearly (proportionally) with respect to the reference current value, according to the magnitude of the value of the voltage outputted from duty-designation-voltage generating portion 34.

In this case, duty-designation-voltage generating portion 34 generates a designation voltage which designates the ON/OFF duty in PWM control portion 32, by reducing the output voltage from DC-voltage conversion portion 8 or a DC voltage supplied from the external power supply. Based on the designation voltage, PWM control portion 32 controls the ON/OFF duty in upper-stage switching devices Q1, Q3 and Q5 or lower-stage switching devices Q2, Q4 and Q6 in inverter circuit 6. Reference current value designation portion 36 sets the reference value of the current supplied to inverter circuit 6, when the designation voltage generated by duty-designation-voltage generating portion 34 is a predetermined voltage. Supply current value control portion 47 controls duty-designation-voltage generating portion 34 such that the average value of the current supplied to inverter circuit 6, which is detected by current detection portion 15, is equal to a current value designated by current value designation portion 9, thereby varying the ON/OFF duty in PWM control portion 32, in such a way as to perform feedback control. Air-quantity designation portion 20 designates a plurality of operating air quantities in blower apparatus 10.

In this case, in consideration of the withstand voltage and the kickback voltage of inverter circuit 6, there is defined an upper limit to the ON/OFF duty, and there are provided intervals within which it is operated at a constant ON/OFF duty without being controlled in terms of the current. Reference current value designation portion 36 determines the reference value of the current supplied to inverter circuit 6 when the DC voltage generated by duty-designation-voltage generating portion 34 is a predetermined voltage, through the magnitude of the resistance value of resistance R2 connected thereto. Air-quantity designation portion 20 controls torque-characteristic change portion 24. Further, torque-characteristic change portion 24 changes the resistance value of resistance R2 connected to reference current value designation portion 36, through reference current value designation change portion 21. Further, torque-characteristic change portion 24 changes the resistance value of resistance R1 connected to correlation designation portion 33, through correlation change portion 22.

In this ventilation apparatus 1, correlation designation portion 33 provides current value designation portion 9 with designation of the current supplied to inverter circuit 6 by changing the current linearly with respect to the reference current value, according to the magnitude of the value of the voltage outputted from duty-designation-voltage generating portion 34. Therefore, as the rotation speed of electric motor 11b is increased, the supplied current is increased. On the contrary, as the rotation speed of electric motor 11b is decreased, the supplied current is decreased. As a result thereof, electric motor 11b has such a rotation-speed/torque characteristic that the axial torque increases with increasing rotation speed.

Figure 10:
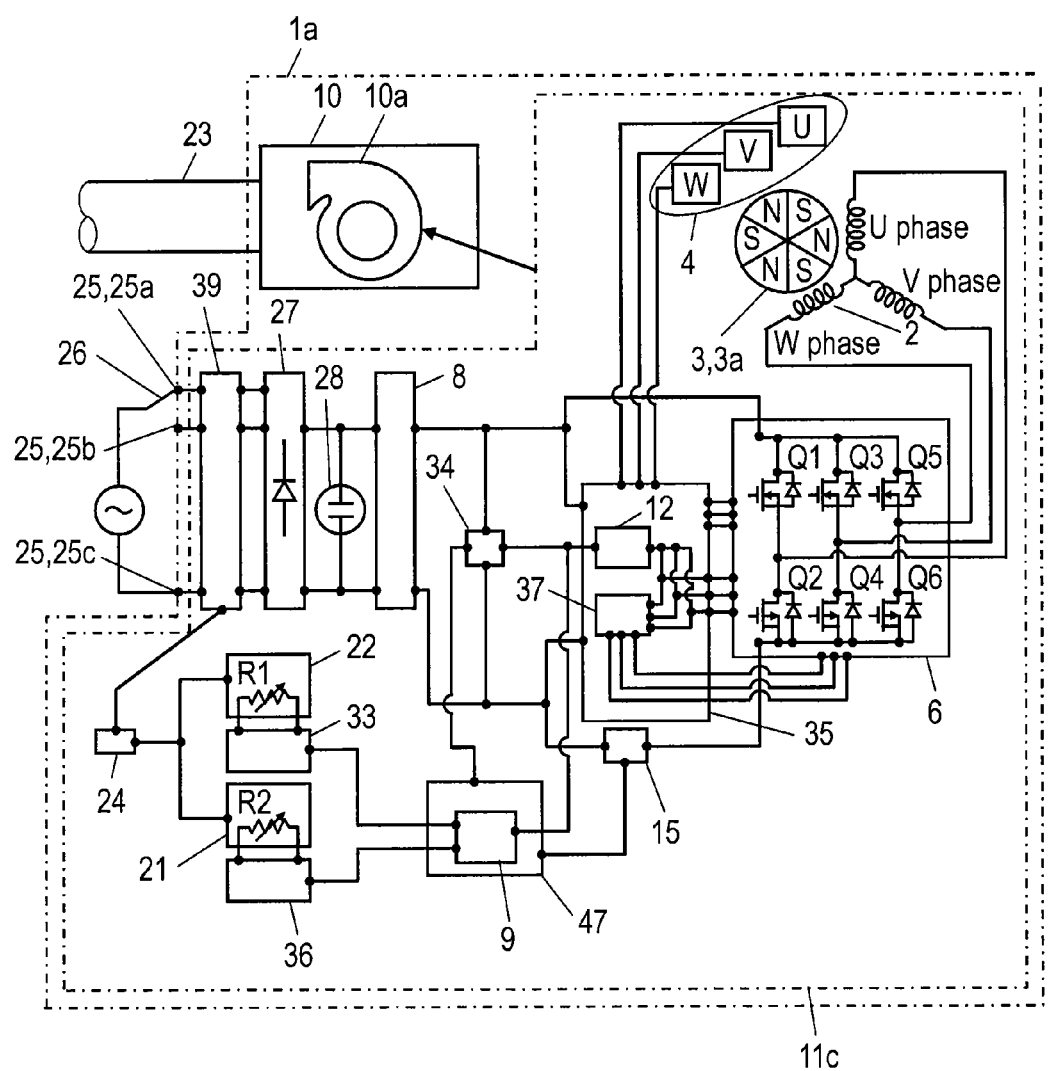
FIG. 10 is a block diagram illustrating a different structure of a ventilation apparatus incorporating the same electric motor.
Figure 11:
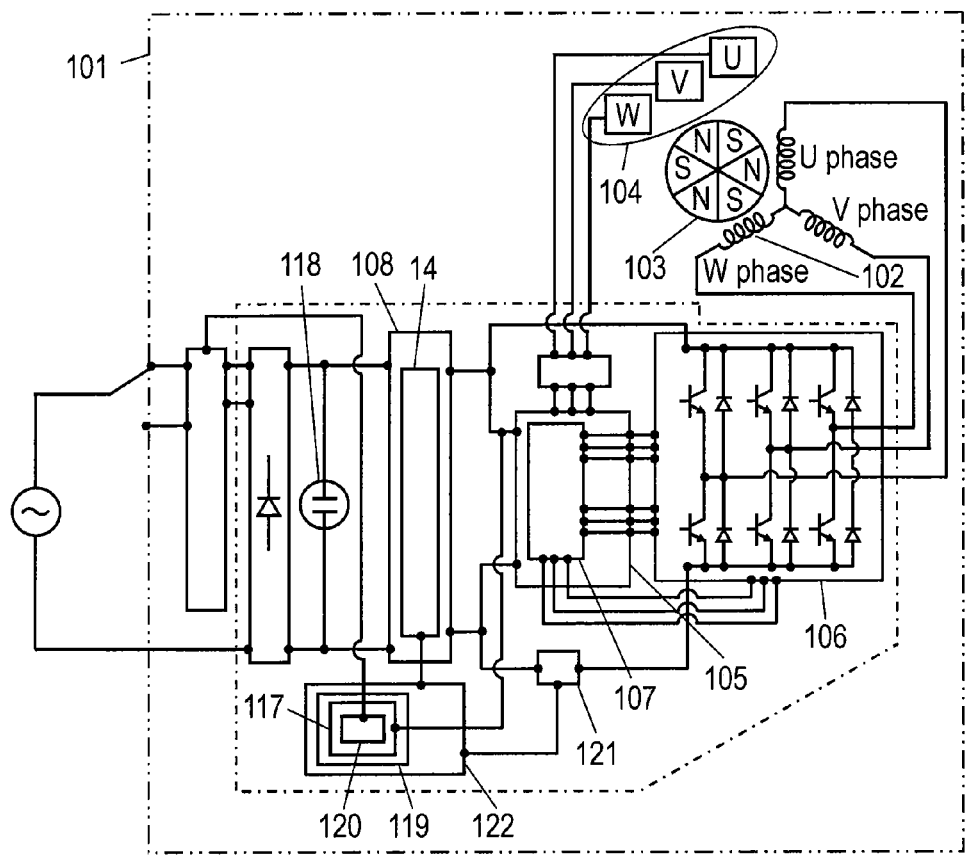
FIG. 11 is a block diagram illustrating a conventional electric motor.

FIG. 10 is a block diagram illustrating a different structure of a ventilation apparatus incorporating the electric motor according to the embodiment of the present invention. The same components as the components illustrated in FIG. 8 are designated by the same reference characters in FIG. 10 and will not be described in detail, and only differences will be described. As illustrated in FIG. 10, ventilation apparatus 1a incorporates blower apparatus 10. Further, blower apparatus 10 incorporates centrifugal blower 10a equipped with electric motor 11c. A commercial AC power supply inputted thereto is rectified and smoothened by rectification portion 27 and smoothing portion 28. Further, a predetermined DC voltage generated by DC-voltage conversion portion 8 is applied to inverter circuit 6. DC-voltage conversion portion 8 is constituted by a buck-type chopper circuit. Air-quantity designation portion 39 detects which of high-output connection terminal 25a and low-output connection terminal 25b outer switch 26 is being connected to. Torque-characteristic change portion 24 sends signals to reference current value designation change portion 21 and correlation change portion 22, on receiving an output signal from air-quantity designation portion 39.

In this ventilation apparatus 1a, AC power-supply connection portions 25 are provided with high-output connection terminal 25a and low-output connection terminal 25b. Further, air-quantity designation portion 39 detects whether it is being connected to high-output connection terminal 25a or to low-output connection terminal 25b. Based on the result thereof, air-quantity designation portion 39 controls torque-characteristic change portion 24 and reference current value designation change portion 21 for commanding them to change the resistance value of resistance R2 connected to reference current value designation portion 36. Thus, air quantities in two stages can be provided by changing the reference set value of the current supplied to inverter circuit 6. This provides ventilation apparatus 1a capable of speed adjustments through changeovers of the connection of the AC power-supply line. In this case, AC power-supply connection portions 25 can be adapted such that torque-characteristic change portion 24 can change the reference set value, according to designation from air-quantity designation portion 39, depending on the number of the connection terminals therein, which can provide such an air-quantity/static-pressure characteristic that the ventilation air quantity increases at higher humidity in comparison with at a normal humidity, by amounts corresponding to the number of the connection terminals.

Further, air-quantity designation portion 39 changes the resistance value of resistance R1 connected to correlation designation portion 33, by controlling correlation change portion 22. Therefore, with ventilation apparatus 1a, it is possible to easily change the air-quantity/static-pressure characteristics through changeovers of the connection of the AC power-supply line.

INDUSTRIAL APPLICABILITY

The electric motor according to the present invention can be mounted in ventilation apparatuses which are required to generate increased air quantities at higher humidity and, further, can be mounted in hot-water supply machines, air conditioning units such as air conditioners, air cleaners, dehumidifiers, drying machines, fan-filter units, and cooling units.

REFERENCE MARKS IN THE DRAWINGS 1, 1a ventilation apparatus
2 driving coil
3 magnet rotor
3a magnetic pole portion
4 Hall device
5, 35 driving logic control portion
6 inverter circuit
7, 37 current waveform control portion
8 DC-voltage conversion portion
9 current value designation portion
10 blower apparatus 10a centrifugal blower
11, 11a, 11b, 11c electric motor
12 magnetic-flux-density distribution waveform synthesis portion
13, 33 correlation designation portion
14 DC-voltage value change portion
15 current detection portion
16, 36 reference current designation portion
17, 47 supply current value control portion
18 air gap
19 stator
20, 39 air-quantity designation portion
21 reference current value designation change portion
22 correlation change portion
23 duct
24 torque-characteristic change portion
25 AC power-supply connection portion
25a high-output connection terminal
25b low-output connection terminal
25c common connection terminal
26 outer switch
27 rectification portion
28 smoothing portion
29 torque-characteristic change designation detection portion
32 PWM control portion
34 duty-designation-voltage generating portion
Q1, Q3, Q5 upper-stage switching device
Q2, Q4, Q6 lower-stage switching device

The invention claimed is:

1. An electric motor comprising:
a magnet rotor which is rotatably placed with an air gap interposed between the magnet rotor and a stator around which a driving coil is wound, the magnet rotor having a magnetic pole portion formed from a plastic magnet which swells by a hydrogen bond;
an inverter circuit including an upper-stage switching device and a lower-stage switching device which are connected to each other in a bridge manner;
a DC-voltage conversion portion which is formed from a chopper circuit adapted to apply a DC voltage to the inverter circuit;
a driving logic control portion adapted to supply the DC voltage generated by the DC-voltage conversion portion to the driving coils through the inverter circuit, in a successive full-wave energization manner according to a predetermined direction and in a predetermined order;
a supply current value control portion adapted to control an average current supplied to the inverter circuit to be constant;
a current value designation portion adapted to designate an average current value for which the supply current value control portion controls to be constant;
a reference current value designation portion adapted to set a reference current value to be designated by the current value designation portion, when the DC voltage generated by the DC-voltage conversion portion is a predetermined voltage; and
a correlation designation portion adapted to provide the current value designation portion with designation of a correlation between the reference current value and the average current value according to a voltage value of the DC voltage generated by the DC-voltage conversion portion, wherein
the correlation designation portion determines the average current value by changing the average current value linearly or non-linearly with respect to the reference current value, and
the magnetic pole portion absorbs moisture to swell to make the air gap smaller, at a higher humidity than a reference humidity.

2. The electric motor according to claim 1, further comprising:
a reference current value designation change portion adapted to change designation of the reference current value designation portion; and
a torque-characteristic change portion adapted to designate a plurality of torque characteristics and to control the reference current value designation change portion.

3. The electric motor according to claim 2, wherein the torque-characteristic change portion controls the reference current value designation change portion.

4. The electric motor according to claim 2, further comprising a plurality of AC power-supply connection portions for connecting an AC power supply, wherein
the torque-characteristic change portion changes the torque characteristic depending on a position of connection to the AC power-supply connection portions.

5. The electric motor according to claim 1, wherein
the magnetic pole portion is a plastic magnet containing polyamide 6 resin as a main binder.

6. The electric motor according to claim 5, wherein
the plastic magnet is a polar anisotropic magnet.

7. The electric motor according to claim 1, wherein
the driving logic control portion further includes a current waveform control portion for controlling the upper-stage switching device and the lower-stage switching device in a manner to bring the switching devices into a non-saturated state close to saturation.

8. The electric motor according to claim 1, wherein
the DC-voltage conversion portion generates a designation voltage which designates an ON/OFF duty for performing PWM control of the switching devices, and
the driving logic control portion further includes a PWM control portion for performing PWM control of one of the upper-stage switching device and the lower-stage switching device based on the designation voltage.

9. An electrical apparatus equipped with the electric motor according to claim 1.

10. The electrical apparatus according to claim 9, being any one of a ventilation apparatus, dehumidifier, humidifier, air conditioning unit, hot-water supply machine, fan-filter unit and cooling unit.

* * * * *